Patented Dec. 22, 1942

2,306,274

UNITED STATES PATENT OFFICE 2,306,274

PROCESS OF MAKING MOLDABLE PRODUCTS

John G. Meiler, Wausau, Wis.

No Drawing. Application January 7, 1938, Serial No. 183,825

10 Claims. (Cl. 106—163)

This invention relates to the production of products from lignocellulosic material suitable for molding and articles made from same.

Broadly this invention covers the production of a molded product by the digestion of definite proportions of lignocellulose, alkali, and acid-producing organic compounds, under definitely controlled conditions of time, temperature and pressure.

The process herein disclosed involves the digestion of the lignocellulosic material under conditions similar to those used in the paper industry for the preparation of soda pulp with these important differences:

(1) The digestion for the most part is carried out at higher temperatures and pressures than are used in the paper industry;

(2) The amount of alkali used is, in general, less than that used in producing paper pulp;

(3) The digesting liquors contain an organic compound other than the lignocellulose capable of liberating acids, preferably inorganic acids, under the conditions of the digestion. The acids liberated of course do not occur as free acids as long as the solution remains alkaline but are neutralized by the alkaline material. This group of compounds will be hereinafter designated as acid producing organic compounds.

(4) The digestion is continued at least to a point where little or preferably no immediate precipitate is obtained by adding acid to the digesting liquor.

The temperature of the digestion must be high enough to accomplish the required alkaline hydrolysis of the wood and of the acid-producing organic compounds. Coupled with these two considerations is the necessity of adjusting it to give the best possible molded product.

The amount of alkali used depends upon the amount of acid or acidic material liberated during the digestion, or more specifically upon the temperature and the time of digestion and upon the amount of the acid-producing organic compound used. However, in no case does the amount of acid liberated by the added acid-producing organic compounds neutralize all the alkali used since the lignocellulose itself, as is well known, liberates some acidic compounds which neutralize part of the alkali. In the examples hereinafter given and in most of the tests made the amount of alkali used was less than that used in the production of soda pulp, but this should not be interpreted to mean that larger amounts of alkali cannot be used if desired. The alkali most frequently used was sodium hydroxide, but such alkaline waste products as the alkaline lignin liquors produced by the various alkaline pulping processes in the paper industry can also be used.

The group of acid-producing organic compounds which can be used is very large. The selection of the compound to be used depends upon a variety of factors, the most important of which are: (1) the temperature at which its alkaline hydrolysis proceeds at a sufficiently rapid rate; (2) the value of its products of hydrolysis in improving the properties of the final molded product, and (3) its cost and availability. Thus a material like the acid sludge from the petroleum refining industry which is a sulphonated product can be used because of its availability and low cost. Compounds like the chlorine derivatives of the coal tar pitch sold under the commercial name Resin "C" may be used because of the plasticizing action of their products of hydrolysis. The following acid-producing organic compounds will satisfy one or all of the above enumerated factors: (1) halogenated organic compounds, for example, the mono- and poly-chlorinated derivatives of hydrocarbons such as mono- and dichlorobenzene, mono- and dichlorethane, polychlor-pentanes, benzylchloride, and cyclic chlor derivatives; (2) sulphonated compounds, for example, the mono- and poly- sulphonated derivatives of hydrocarbons, such as, sulphonated olefines obtained from cracked petroleum, and the mono- and polysulphonic acids of benzene, naphthalene, etc.; and (3) the more or less complex materials such as acid sludge from the petroleum refining industry which is a sulphonated product, and chlorinated pitches like chlorinated resin "C." Combinations of these acid-producing organic compounds will also be found satisfactory. It is understood that in the case of the polyhalogenated derivatives or the polysulphonated derivatives it is not necessary that all the halogen or sulphonic acid groups be removed from any molecule.

The value of introducing acid-producing compounds is determined by their effect on the properties of the final molded articles. The properties which can be improved are strength, water resistance, plasticity, and flexibility. The modification of these properties is accomplished in various ways. As previously cited the use of a compound like chlorinated resin "C" increases the plasticity and water resistance of the molded product. Likewise, the products of hydrolysis of such compounds as mono- and di-chlorbenzene increases the water resistance and plasticity of the molded product and it is believed this is due to the reaction of the phenolic material with the lignocellulose or with its decomposition products. We may also modify the properties of the end product by introducing a compound which will react with the products of hydrolysis to give a resinous material. It is also possible to select two types of acid-producing organic compounds, e. g., phenyl chloride and methylene dichloride whose products of hydrolysis will react with each other to give resinous products. By selecting the type of acid producing compound and controlling the temperature of the initial digestion we can hydrolyze the lignocellulose with no appreciable hydrolysis of the acid producing compound. The temperature can then be raised and the hydrolysis of the acid producing compound made to proceed at an appreciable rate. This sequence of reactions occurs in all digestions in which the acid producing compound hydrolyzes at a relatively high temperature say above 135° C. Furthermore it is possible to introduce the acid producing compound after the digestion has proceeded to a desired point. Such initial alkaline digestion of the lignocellulose is generally advantageous, but if desired the hydrolysis of the acid producing organic compound can be made to occur first by using an easily hydrolyzable compound.

The time of digestion is determined by the properties desired in the final molded product. The minimum time of digestion, however, is easily determined; a filtered sample of the digesting liquor is treated with strong acid and the digestion is continued until little or no precipitate is formed on such acidification. The most desirable end point of the digestion will be found to be slightly beyond this minimum time.

In order that the invention may be better understood the following examples are given as illustrative procedures of the invention, it being understood that the examples are merely illustrative and that they in no way limit the invention.

Example 1

A charge consisting of

| | | |
|---|---|---|
| Wood flour | gm | 300 |
| Sodium hydroxide | do | 30 |
| Mono-chlorbenzene | cc | 20 |
| Di-chlorbenzene | do | 10 |
| Water | do | 1,800 | was placed in an externally heated autoclave and digested 2 hours at 350 lbs. per sq. in. pressure (225° C.). The digester was then cooled and the charge removed. The digested product was washed with water until practically free from inorganic salts and other water soluble material and air dried. Upon molding this air-dried material, a strong, black, water resistant product was obtained, the molding conditions being 2,000 lbs. per sq. in. and 185° C.

Example 2

A charge consisting of

| | | |
|---|---|---|
| Wood flour | gm | 300 |
| Sodium hydroxide | do | 30 |
| Butyl chloride (normal and secondary) | cc | 30 |
| Water | do | 1,800 | was placed in an externally heated autoclave and digested for 4 hours at 350 lbs. per sq. in. (225° C.). The product was then washed, air-dried, and molded as in Example 1, but the resulting molded product was not as strong as that obtained in Example 1.

This Example 2 not only illustrates the use of one type of acid-producing compound, but also shows the effect of over-digestion, and the need for absolute control during digestion. An improvement in its properties may be obtained by using more alkali or by reducing the time of digestion.

It is to be understood that wood flour was used in these examples merely for the sake of convenience since the invention applies to all lignocellulose in any state of subdivision. The digestion product is washed, ground, if necessary, and used as a molding composition, or it may be refined in the paper-making sense to a pulp and sheeted and the sheeted product molded singly or made into laminated articles in the usual way. Resins, pigments, fillers, plasticizers, etc., may be incorporated into the washed, ground, or refined product. It has been found that oven-dried products will not mold satisfactorily and hence the products should not be completely dried.

It is to be understood that numerous changes and modifications may be made in the process and product produced thereby without departing from the spirit of the invention and it is intended to broadly include such variations and modifications as defined in the appended claims except as they may be restricted by the prior art.

I claim:

1. A process of treating lignocellulose for producing a product moldable under heat and pressure which comprises preparing an initial mixture comprising lignocellulose, an aqueous alkaline solution and a predetermined amount of an acid producing organic compound capable of liberating acid under the conditions of lignocellulose digestion but in amounts insufficient to neutralize all the alkali present, digesting the lignocellulose at elevated temperature and pressure continuing said treatment to hydrolyze the said organic compound and to generate additional acidic compounds derived from the lignocellulose to neutralize the alkali and until the solution is substantially free from acid precipitatable materials, washing and drying the resultant mass.

2. A process of treating lignocellulose for producing a product moldable under heat and pressure which comprises preparing an initial mixture comprising lignocellulose, an aqueous alkaline solution containing a predetermined amount of an acid producing organic compound capable of liberating acid under the conditions of lignocellulose digestion but in amounts insufficient to neutralize all the alkali present, digesting the lignocellulose at elevated temperature and pressure, continuing said treatment to hydrolyze the said organic compound and to generate additional acidic compounds derived from the lignocellulose to neutralize the alkali and until the solution is substantially free from acid precipitatable materials, washing the resultant mass, grinding the said washed mass, and air drying the said mass.

3. A process of treating lignocellulose for producing a product moldable under heat and pressure which comprises preparing an initial mixture comprising lignocellulose, an alkaline solution and a predetermined amount of an acid producing organic compound capable of liberating acid under the conditions of lignocellulose digestion but in amounts insufficient to neutralize all the alkali present, digesting said mixture at elevated temperature and pressure, continuing said treatment to hydrolyze the lignocellulose without substantial hydrolysis of said organic compound, continuing the treatment at a higher temperature sufficient to hydrolyze the said organic compound, and to generate additional acidic compounds derived from the lignocellulose to neutralize the alkali and until the solution is substantially free from acid precipitatable materials, washing and drying the resultant mass.

4. A process of treating lignocellulose for producing a product moldable under heat and pressure which comprises preparing an initial mixture comprising lignocellulose, an alkaline solution and a predetermined amount of an acid producing organic compound capable of liberating acid under the conditions of lignocellulose digestion but in amounts insufficient to neutralize all the alkali present, digesting the lignocellulose at elevated temperature and pressure, continuing said treatment to hydrolyze the said organic compound and to generate additional acidic compounds derived from the lignocellulose to neutralize the alkali and until the solution is substantially free from acid precipitable materials, washing and drying the resultant mass, and adding a plasticizer.

5. A process of treating lignocellulose for producing a product moldable under heat and pressure which comprises preparing an initial mixture comprising lignocellulose, an alkaline solution and a predetermined amount of an acid producing halogenated hydrocarbon compound capable of liberating acid under the conditions of lignocellulose digestion but in amounts insufficient to neutralize all the alkali present, digesting the lignocellulose at elevated temperature and pressure, continuing said treatment to hydrolyze the said organic compound and to generate additional acidic compounds derived from the lignocellulose to neutralize the alkali and until the solution is substantially free from acid precipitatable materials, washing and drying the resultant mass.

6. A process of treating lignocellulose for producing a product moldable under heat and pressure which comprises preparing an initial mixture comprising lignocellulose, an alkaline solution containing an acid producing chlorinated benzene derivative capable of liberating acid under the conditions of lignocellulose digestion but in amounts insufficient to neutralize all the alkali present, digesting the lignocellulose at elevated temperature and pressure, continuing said treatment to hydrolyze the said organic compound and to generate additional acidic compounds derived from the lignocellulose to neutralize the alkali and until the solution is substantially free from acid precipitatable materials, washing and drying the resultant mass.

7. A process of treating lignocellulose for producing a product moldable under heat and pressure which comprises preparing an initial mixture comprising lignocellulose, an alkali solution and a predetermined amount of an acid producing mono- and dichlorbenzene capable of liberating acid under the conditions of lignocellulose digestion but in amounts insufficient to neutralize all the alkali present, digesting the lignocellulose at a temperature of about 225° C. and for about 2 hours to hydrolyze the said compounds and to generate additional acidic compounds derived from the lignocellulose to neutralize the alkali and until the solution is substantially free from acid precipitatable materials, washing and drying the resultant mass.

8. A hard, dense, dark, strong, water-resistant, homogeneous article molded from the product made according to claim 1.

9. A hard, dense, dark, strong, water-resistant, homogeneous article molded from the product made according to claim 4.

10. A hard, dense, dark, strong, water-resistant, homogeneous article molded from the product made according to claim 7.

JOHN G. MEILER.